United States Patent
Dorsey et al.

(10) Patent No.: US 6,920,613 B2
(45) Date of Patent: Jul. 19, 2005

(54) VIDEO/TEXT BI-DIRECTIONAL LINKAGE FOR SOFTWARE FAULT CLEARANCE APPLICATIONS

(75) Inventors: Jonathan A. Dorsey, Rochester, NY (US); David S. Matthews, Rochester, NY (US); Jonathan A. Goldstein, Rush, NY (US)

(73) Assignee: Xerox Corporation, Stamford, CT (US)

( * ) Notice: Subject to any disclaimer, the term of this patent is extended or adjusted under 35 U.S.C. 154(b) by 718 days.

(21) Appl. No.: 09/939,984

(22) Filed: Aug. 27, 2001

(65) Prior Publication Data

US 2004/0205087 A1 Oct. 14, 2004

(51) Int. Cl.[7] .................................................. G09G 5/00
(52) U.S. Cl. ...................... 715/714; 715/804; 715/771; 715/719
(58) Field of Search .................................. 715/821, 814, 715/781, 767, 764, 771, 778, 788, 792, 804, 805, 813, 714, 719, 717, 761, 765; 358/1.13, 1.15

(56) References Cited

U.S. PATENT DOCUMENTS

| | | | | |
|---|---|---|---|---|
| 4,899,292 A | * | 2/1990 | Montagna et al. | 707/104.1 |
| 5,212,635 A | * | 5/1993 | Ferriter | 705/11 |
| 6,033,226 A | * | 3/2000 | Bullen | 434/219 |
| 6,138,056 A | * | 10/2000 | Hardesty et al. | 700/174 |
| 6,721,879 B1 | * | 4/2004 | Tanaka | 713/1 |
| 6,750,884 B1 | * | 6/2004 | Steigerwald et al. | 715/771 |
| 2001/0017023 A1 | * | 8/2001 | Armington et al. | 53/472 |
| 2002/0104293 A1 | * | 8/2002 | Armington et al. | 53/472 |

* cited by examiner

*Primary Examiner*—Tadesse Hailu
(74) *Attorney, Agent, or Firm*—Fay, Sharpe, Fagan, Minnich & McKee, LLP

(57) ABSTRACT

A fault clearance system and method for a graphical user interface. The system includes a plurality of video objects, each video object corresponding to a respective fault of a reprographic or printing system. Each video object further includes a plurality of video segments corresponding to fault clearance steps. Similarly, a plurality of text objects correspond to respective faults of the reprographic or printing system, and each text object further includes a plurality of text steps, one corresponding to each video segment of the respective video object. A bi-directional linkage system links each of the video segments to one of the text steps and each of the text steps is linked to one of the video segments. A video window displays the video segments, and a text window displays one or more of the text steps of a selected text object. The video window displays a video segment linked to a highlighted text step in the text window and the highlighted text step in the text window is linked to the video segment in the video window.

22 Claims, 4 Drawing Sheets

VIDEO/TEXT BI-DIRECTIONAL LINKAGE FOR SOFTWARE FAULT CLEARANCE APPLICATIONS

FIELD OF THE INVENTION

This invention is directed to a user interface having information screens for displaying instructive information.

BACKGROUND OF THE INVENTION

Present and future high capacity printing and reprographic systems support high volume document production for commercial and printing center operations, with a wide range of input and finishing configurations. Further, operators are provided with many job programming options and selections in order to maintain an efficient usage of these printing systems.

In view of the complexity of these high capacity printing systems, and the user interfaces provided for their operation and control, it is to be expected that fault conditions will occur in supply unit devices and output unit devices. High capacity printing and reprographic systems exist which provide a graphical user interface that informs an operator of these faults as they occur and provides instructive information in fault screen windows providing the operator with the information necessary to know what the fault condition is and also how to correct the fault condition. For example, a typical high capacity reprographic system, upon determining the presence of a fault, will open a window on a user interface screen with a text message indicating the source of the fault. The system may optionally display a bit mapped graphic image of the section of the machine in need of attention. The image may, for example, show a picture of a drawer that must be pulled out to replenish a paper supply.

While a bit mapped image may be sufficient for simple faults such as an out-of-paper condition, it may not be adequate for more complicated faults such as a paper jam in the transport mechanism of a reprographic system. Clearing such a fault may require multiple steps such as: opening a door, turning a lever clockwise, pulling out a mechanism, lifting a cover, etc. Such a sequence of steps is difficult for an operator to follow even when multiple images are provided to illustrate each step because the images do not convey information about the movements required to accomplish the task. Arrows may be provided to convey this information, however, this requires the operator to examine each image and text message carefully to understand the necessary movements.

Therefore, there is a need for a system and method by which an operator of a high capacity printing or reprographic system can be given instructions that are easily and readily interpreted for clearing fault conditions. Further, it would be advantageous if these instructions can be presented in a manner that allows the operator to preview the complete procedure, or portions of the procedure, to become familiar with the steps involved before performing the procedure. Still further, it would be advantageous if instructions could be presented simultaneously in video and text formats wherein the text and video are synchronized with each other.

SUMMARY OF THE INVENTION

According to an aspect of the present invention, there is provided a system and method for providing information in video art text format via a graphical user interface. The system includes a plurality of video objects, wherein each video object corresponds to information such as a respective fault of a reprographic or printing system, and wherein each video object further includes a plurality of video segments. A plurality of text objects is provided, wherein each text object also provides information related to, for example, a respective fault of the reprographic or printing system, and wherein each object further includes a plurality of text steps. A bi-directional linkage system links each of the video segments to one of the text steps and each of the text steps is linked to one of the video segments. A video window is provided for displaying the video segments, and a text window is provided for displaying one or more of the text steps of a selected text object, wherein the video window displays a video segment linked to a highlighted text step in the text window and the highlighted text step in the text window is linked to the video segment in the video window.

DESCRIPTION OF THE DRAWINGS

The present invention exists in the construction, arrangement, in combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
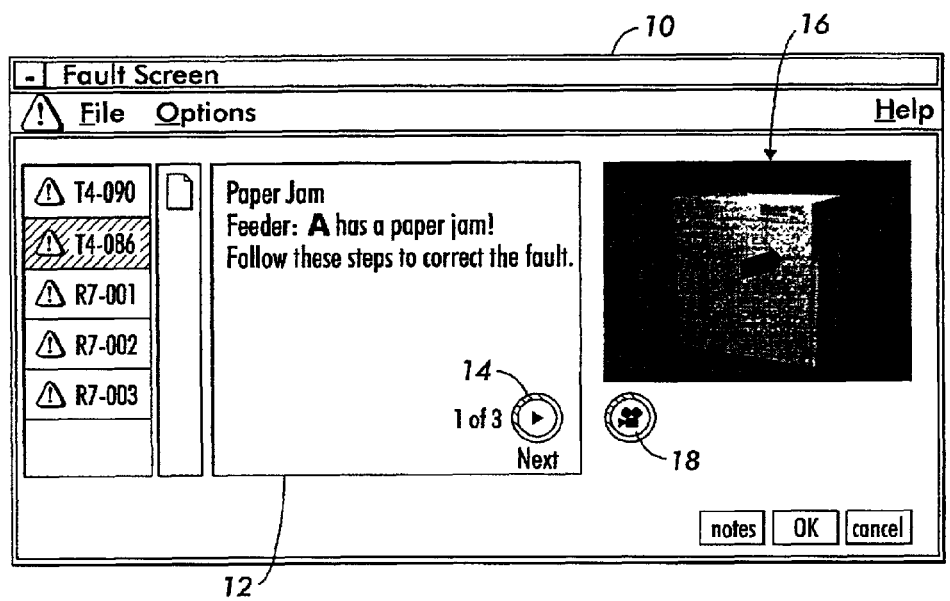
FIG. 1 shows an exemplary prior art fault clearance graphical user interface screen.

With reference to FIG. 1, an exemplary prior art fault window 10 is shown as it would appear on a user interface display screen. Fault window 10 provides information relevant to faults that occur, in this example, within a unit of a reprographic system such as, for example, paper jams, empty supply trays, etc. Text window 12 indicates that feeder A has a paper jam, where feeder A is a symbolic name of a paper feeder supplying the reprographic system. Additional step-by-step instructions relative to the fault can be accessed by selecting next button 14 or, alternately, as each step in the fault clearance procedure is performed, text window 12 can automatically advanced to display text for the next step to be performed.

As a visual aid to the operator of the reprographic system, an image window 16 is provided showing a picture of the unit in need of attention. Typically, the image will include an arrow indicating specifically where the fault has occurred or indicating a direction in which a control must be moved. A video aid may also be provided, activated by button 18, that will play a video of the fault clearance procedure in image window 16.

While the fault clearance procedure illustrated in FIG. 1 is useful and informative, it would be beneficial to provide instructions that are more easily and readily interpreted for clearing fault conditions. It would be advantageous if instructions could be presented simultaneously in video and text formats wherein the text and video are synchronized with each other.

Figure 2A:
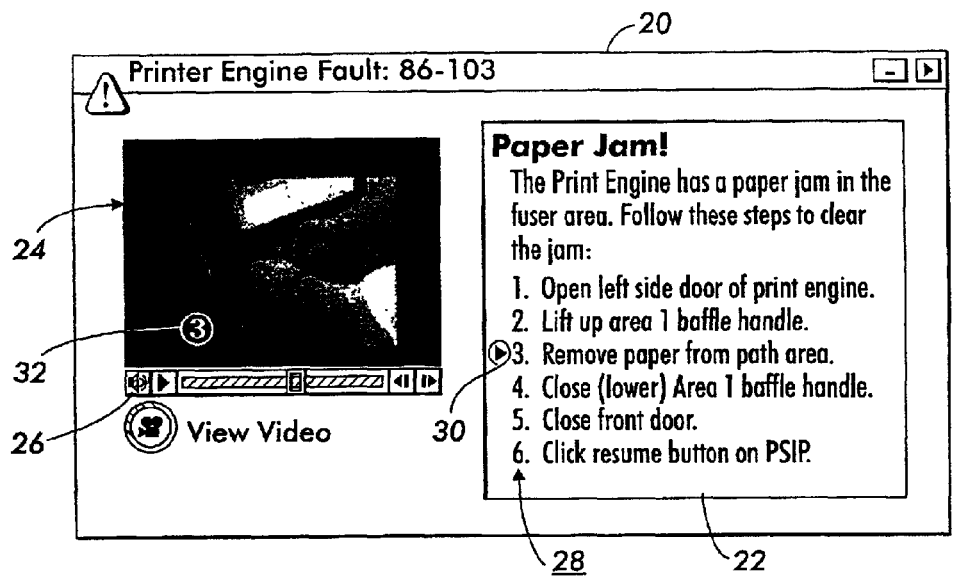
FIG. 2A shows a fault clearance graphical user interface screen illustrating video to text linkage of the present invention.

FIG. 2A shows a preferred embodiment of the present invention that provides video and text synchronization by means of a bi-directional linkage. A fault correction window 20 is provided on a user interface display that includes a text window 22, a video window 24 and a video control bar 26. Video control bar 26 provides standard video player controls such as, for example, a start button for starting the video, a slider for advancing the video in a forward or reverse direction, a rewind to beginning button and a forward to end button. Within text window 22, an enumerated list 28 of fault clearance steps is provided with a step indicator 30 to indicate the step currently being performed. For improved readability, the indicated step is highlighted to provide an effective visible cue for the operator and to make text of the relevant step visually more distinct. The highlighting may be done by any suitable means such as making the text bold, italicizing the text, underlining the text, changing the color of the text, shading the remaining inactive steps or other arrangements to provide highlighting.

In a preferred embodiment, the steps enumerated in text window 22 are bi-directionally linked to the video in video window 24. In a fault clearance step-by-step instruction video, when, for example, step 3 is reached as shown, there is a link to text window 22 causing the respective step 3 text to be made visually more distinct as previously described. To further enhance making the respective step in text window 22 visually distinct, a step number icon 32 may optionally be displayed in video window 24. This creates a strong visual tie between the two different types of information, enabling the reader to more quickly sense and compare for faster comprehension. If the video is fast forwarded or rewound by control bar 26, the text follows along, becoming visually accented when its corresponding section of the video is reached. This is accomplished by video-to-text linking.

With video-to-text linking, the video and text are linked but separate. That is to say, the video and text are separate objects wherein the video object is encoded with links to corresponding steps in the text object. In the preferred embodiment, the text is not provided within the video window 24, but instead is located in a scrollable window 22 near the video window 24. Although provided simultaneously, the video and the text can each be viewed separately. An example where this is beneficial is when an operator has become familiar with the system on which a fault has occurred and only needs to view the steps in text window 22, using the text as a checklist.

Figure 2B:
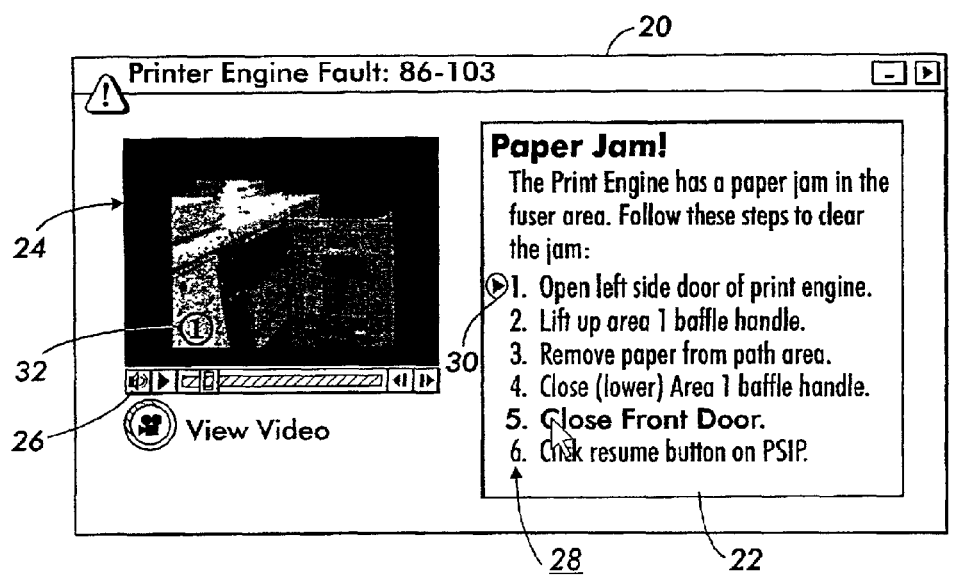
FIG. 2B shows a fault clearance graphical user interface screen illustrating text to video linkage of the present invention.

In addition to video-to-text linking, text-to-video linking is also provided in the preferred embodiment. As shown in FIG. 2B, an operator has selected step 5 in text window 22. A mouse pointer was used in this example, however, any suitable selection means, such as a keyboard selection, can be utilized. Selecting step 5 in the text window makes that step "hot" and, therefore, the video in video window 24 automatically rewinds or fast-forwards to the beginning of step 5 and starts playing the video for that step. This is an example of text-to-video linking, however, it also illustrates the bi-directional nature of the linking. An operator may select a step in the text window in which case the video automatically synchronizes to the text or, on the other hand, the operator may use control bar 26 to forward or rewind the video to a desired step in which case the corresponding step in the text window becomes highlighted as active.

While video window 24 and text window 22 are shown to be approximately the same size in FIGS. 2A and 2B, the respective windows may be resized by an operator according to his or her preferences. For example, when an operator is primarily concerned with the video for instructive purposes, the operator may shrink the text window 22 and expand the video window 24 so the video is more discernible from a distance. Similarly, an operator using the text window 22 as a check list may wish to shrink the video window 24 and expand the text window 22. Resizing of the respective windows can be accomplished by standard, well known methods such as dragging a side or corner of a window with a mouse pointer to the desired size.

Figure 3A:
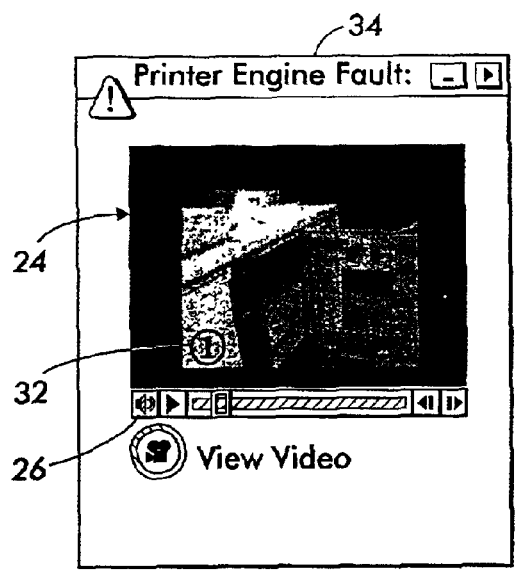
FIG. 3A illustrates an alternate embodiment of the present invention showing video instructions presented in a separate window.
Figure 3B:
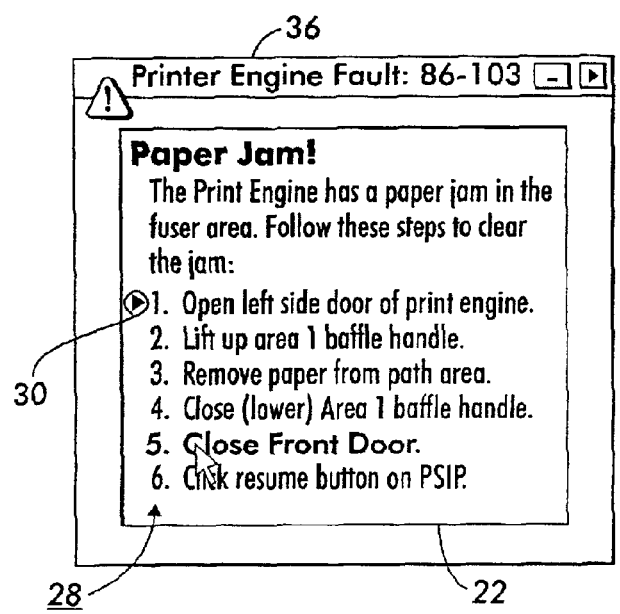
FIG. 3B illustrates an alternate embodiment of the present invention showing text instructions presented in a separate window.

Because the video content and text content are derived from separate objects as described above, the video may alternately be displayed in a separate fault window 34 as shown in FIG. 3A while the text is simultaneously displayed in another fault window 36 as shown in FIG. 3B. Although the video and text are shown in separate fault windows and remain separate objects, the above-described bi-directional linkage still exists and the video/text interaction as previously described operates substantially unchanged when separate fault windows are employed. For example, an operator selecting step 5 in text window 22 within fault window 36 makes that step "hot" and, therefore, the video in video window 24 within fault window 34 automatically rewinds or fast-forwards to the beginning of step 5 and starts playing the video for that step.

Optional resizing of fault windows 34 and 36 provides an operator with the ability to enlarge a preferred window or shrink a less desired window as desired. Alternately, when separate fault windows 34 and 36 are employed, an operator may close one fault window, leaving only the most desired fault window visible on the user interface display.

The above-described embodiment provides an operator great flexibility when viewing fault clearance instructions. For example, the video in window 24 may be rewound and viewed multiple times to gain a familiarity with a new procedure. The text in window 22 may be read as steps are automatically highlighted during the running of the respective video. A complicated or confusing step may be selected in window 22 repeatedly so the video for that step will automatically be replayed each time the corresponding step is selected. If the fault clearance procedure requires activity at some distance from the user interface display, the operator may enlarge the most desired window, video or text, for easier viewing while performing the fault clearance procedure. As each step in the fault clearance procedure is completed, the system can be configured to automatically advance the video and text to the next step so the operator can complete the fault clearance procedure without further interacting with the user interface.

Bi-directional linkage can be implemented in a number of ways. One process not requiring alteration of the text or video objects, is to create a separate object having a table containing video times for each segment or step. The system software can then be configured to automatically advance text window 22 to a corresponding step as the video approaches certain time intervals. On the other hand, if a step is selected in window 22 by the operator, the system software can be configured to determine the total elapsed time of prior steps and, from the total elapsed time, calculate a displacement into the video object corresponding to the total elapsed time. In this way, the video in window 24 can be automatically repositioned to a starting point corresponding to the selected step in window 22.

Other methods of bi-directional video/text linkage may be alternately employed with equal efficacy. Tags may be interspersed within the video object at appropriate intervals corresponding to starting points for each step. These tags can then be utilized to automatically highlight the corresponding step in text window 22 as the tags are encountered during playback of the video in window 24. When, however, a step in text window 22 is selected by the operator, the video may be searched for a tag corresponding to the selected step, and the video can then be automatically repositioned and replayed from that point.

Figure 4:
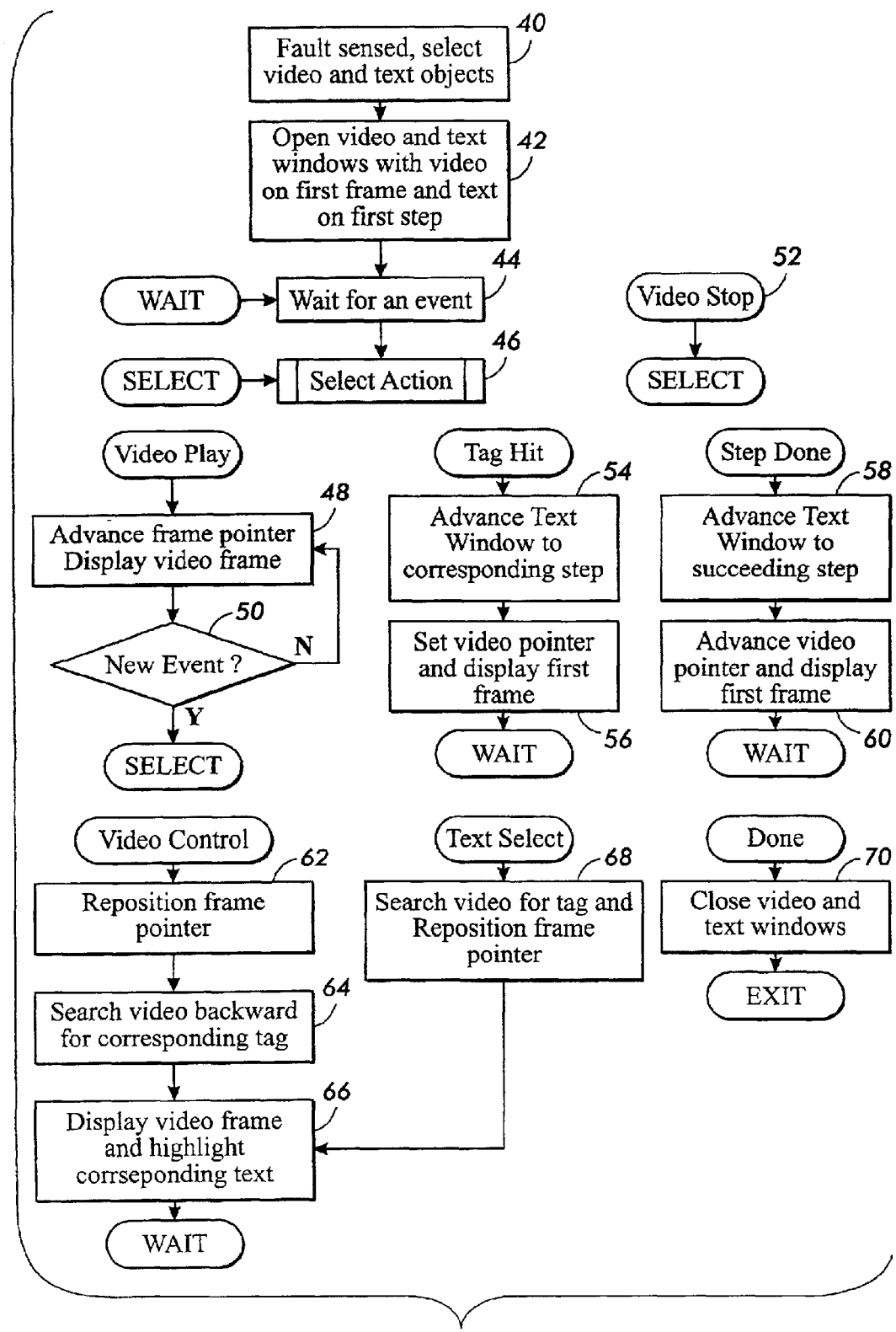
FIG. 4 provides a flowchart of a particular embodiment of the present invention.

To further clarify bi-directional video/text linkage as utilized in the preferred embodiment, a flowchart is provided in FIG. 4. The flowchart provided is simplified as much as possible to provide an overview without presenting detail not necessary for the understanding of the invention. For example, the flowchart assumes that the video has been provided with embedded tags corresponding to each fault clearance step to be enumerated in text window 22. It further assumes that the operator is operating in a "perform" mode wherein the video and text pause at the beginning of each step and the system waits for a signal from the fault device that the previous step has actually been completed before continuing automatically. Alternately, in a "view" mode, the operator might wish to have the video in window 24 play to completion with the corresponding steps in text window 22 scrolling automatically in step with the video. In this alternate case, the video would not pause when embedded tags are encountered.

Initially, the system software selects video and text objects from a database 40, wherein the objects correspond to the particular fault that has occurred. Next, a video window 24 and text window 22 are opened on the user interface display unit with the first video frame displayed in window 24 and the first step highlighted in text window 22. At this point, the software pauses 44 waiting for an event to happen. The events the flowchart of FIG. 4 is concerned with correspond to, in this particular example, selection of a video play button, selection of a video stop button, encountering an embedded tag during video playback, a hardware signal that a step has been completed, a repositioning of the video control, a selection of a specific step in text window 22 and a signal that the fault clearance procedure is complete.

The detected event is then analyzed and an appropriate action is selected for the event 46. In the case of a video play button selection, processing continues at step 48 where a video frame pointer is advanced one frame and the subsequent frame is displayed in window 24. A determination is then made whether another event has occurred 50 and, if not, returns to step 48 for continuous playback of the video segment. A new event occurrence will interrupt the playback, and processing will revert back to step 46 for selection of an appropriate action.

During video playback, a video stop button may be selected in which case processing is directed to step 52, however, no action is necessary except to return to step 44 and wait for another event. Also during video playback, an embedded tag may be encountered, and this event is handled at step 54 where text window 22 is advanced to the step corresponding to the embedded tag, and the selected step is highlighted. The video frame pointer is advanced at step 56 to the first frame of the next step, and that frame is displayed in window 24. In the above-described "perform" mode, the system software returns to step 44 in order to effect a pause and wait for another event to occur.

When a fault clearance step is completed, and a hardware signal causes an event to occur, processing proceeds to step 58 where text window 22 is advanced to the succeeding step. Following this, the video frame pointer is advanced at step 60 to the first frame of the selected step, as identified by an embedded tag immediately preceding the corresponding video segment. Processing then returns to step 44 to wait for another event. Alternately, processing may continue at step 48 to initiate continuous video playback of the selected segment.

When a repositioning of the video is selected by operator action on the video slider, rewind or fast-forward controls, processing proceeds to step 62. At this point, the video frame pointer is repositioned to a corresponding video frame and, at step 64, the video is searched backward for the corresponding embedded tag to determine a corresponding step to be highlighted in window 22. At step 66, the selected video frame is displayed in window 24, and the corresponding text is highlighted in window 22. If, similarly, the operator selects a step in window 22, processing proceeds to step 68 where the video is searched for an embedded tag corresponding to the selected step. When found, the video frame pointer is repositioned to that point and processing then continues at step 66 for updating both of the video and text windows.

When the fault clearance procedure is completed, an event is triggered, and processing is directed to step 70 where the video and text windows are closed. The system then reverts to a normal processing status.

System software programs configured for the above-described embodiments may be developed in a number of high level languages. For example, the software may be programmed directly in the Java language offered Sun Microsystems, Inc. Alternately, a Java development environment may be employed to simplify Java programming. Two examples readily available are Visual Cafe from Symantec Corporation and JBuilder from Borland Software Corporation. Skilled programmers may also prefer to program embodiments directly with either the C or the C++ languages. Other programming languages are also available that provide the necessary functionality to program embodiments of the present invention.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, we hereby claim:

1. An informational system for a graphical user interface comprising:

a plurality of video objects, wherein each video object corresponds to at least one of a plurality of faults of an operational system, and wherein each video object comprises a plurality of video segments;

a plurality of text objects, wherein each text object corresponds to at least one of the plurality of faults of the operational system, and wherein each text object comprises a plurality of text steps;

a bi-directional linkage system wherein each of said video segments is linked to one of said text steps and each of said text steps is linked to one of said video segments;

a video window for displaying said video segments of a selected video object; and a text window for displaying one or more of said text steps of a selected text object wherein said informational system is configured to utilize said bi-directional linkage system to display a linked video segment when a corresponding text step is selected in said text window, and display a linked text step when a corresponding video segment is selected in said video window.

2. The system according to claim 1 further including a text number icon, wherein said icon is displayed in said video window and corresponds to said selected text step in said text window.

3. The system according to claim 1 further including a video control bar, wherein an operator may reposition said selected video object to a desired video frame of a desired video segment, displayed in said video window, and wherein said text window automatically displays a highlighted text step linked to said desired video segment.

4. The system according to claim 3 wherein the system is configured to utilize the bi-directional linking system to automatically advance said desired video frame to succeeding frames and succeeding video segments and to automatically display a corresponding text step linked to each of the succeeding video segments.

5. The system according to claim 1 further including a text selection means, wherein an operator may select a desired text step in said text window and wherein said desired text step becomes said highlighted text step, and wherein said video window automatically displays a video segment linked to said desired text step.

6. The system according to claim 5 wherein the system is configured to utilize the bi-directional linking system to automatically advance said selected text step to succeeding text steps and to automatically display a corresponding video segment linked to each of the succeeding text steps.

7. The system according to claim 1 wherein said bi-directional linkage system comprises video time objects, each time object including a table of video times for each of said video segments.

8. The system according to claim 1 wherein said bi-directional linkage system comprises tags interspersed within said video objects.

9. The system according to claim 1 wherein said operational system comprises a printing system.

10. The system according to claim 1 wherein said operational system comprises a reprographic system.

11. A fault clearance system having a graphical user interface comprising:
a video program to select a video object from a plurality of video objects, wherein said selected video object corresponds to a respective fault of a system, and wherein said selected video object comprises a plurality of video segments;
a text program to select a text object from a plurality of text objects, wherein said selected text object corresponds to a respective fault of said system, and wherein each object comprises a plurality of text steps;
a bi-directional linkage program which links each of said video segments to one of said text steps and links each of said text steps to one of said video segments;
a video display program for displaying said video segments in a video window; and
a text display program for displaying one or more of said text steps in a text window wherein said fault clearance system configured to display a linked video segment when a corresponding text step is selected in said text window, and display a linked text step when a corresponding video segment is selected in said video window.

12. The fault clearance system according to claim 11 further including a text number icon display program, wherein said icon is displayed in said video window and corresponds to said selected text step in said text window.

13. The fault clearance system according to claim 11 further including a video control bar program, wherein an operator may reposition said selected video object to a desired video frame of a desired video segment, displayed in said video window, and wherein said text window automatically displays a highlighted text step linked to said desired video segment.

14. The fault clearance system according to claim 11 further including a text selection program, wherein an operator may select a desired text step in said text window and wherein said desired text step becomes a highlighted text step, and wherein said video window automatically displays a video segment linked to said desired text step.

15. The fault clearance system according to claim 11 wherein said bi-directional linkage program is configured to utilize video time objects, each time object including a table of video times for each of said video segments.

16. The fault clearance system according to claim 11 wherein said bi-directional linkage program is configured to utilize tags interspersed within said video objects.

17. A fault clearance method for a system having a graphical user interface comprising:
selecting a video object from a plurality of video objects, wherein said selected video object corresponds to a respective fault of a system, and wherein said selected video object comprises a plurality of video segments;
selecting a text object from a plurality of text objects, wherein said selected text object corresponds to a respective fault of said system, and wherein each object comprises a plurality of text steps;
bi-directionally linking each of said video segments to one of said text steps;
displaying said video segments in a video window; and
displaying one or more of said text steps in a text window wherein said video window displays a bi-directionally linked video segment when a corresponding text step is selected in said text window, and said text window displays a bi-directionally linked text step when a corresponding video segment is selected in said video window.

18. The fault clearance method according to claim 17 further including displaying a text number icon in said video window wherein said icon corresponds to said selected text step in said text window.

19. The fault clearance method according to claim 17 further including repositioning said selected video object to a desired video frame of a selected video segment in said video window, and wherein said text window automatically displays a corresponding text step linked to said selected video segment.

20. The fault clearance method according to claim 17 further including selecting a text step in said text window and wherein said selected text step becomes a highlighted text step, and wherein said video window automatically displays a video segment linked to said selected text step.

21. The fault clearance method according to claim 17 wherein said bi-directional linking utilizes video time objects, each time object including a table of video times for each of said video segments.

22. The fault clearance method according to claim 17 wherein said bi-directional linking utilizes tags interspersed within said video objects.

* * * * *